(12) United States Patent
Bacardit et al.

(10) Patent No.: US 9,694,798 B2
(45) Date of Patent: Jul. 4, 2017

(54) VACUUM BRAKE BOOSTER

(71) Applicant: Robert Bosch GmbH, Stuttgart (DE)

(72) Inventors: Joan Simon Bacardit, Barcelona (ES);
Bruno Berthomieu, Barcelona (ES)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 14/404,804

(22) PCT Filed: May 22, 2013

(86) PCT No.: PCT/EP2013/060487
§ 371 (c)(1),
(2) Date: Dec. 1, 2014

(87) PCT Pub. No.: WO2013/178514
PCT Pub. Date: Dec. 5, 2013

(65) Prior Publication Data
US 2015/0114214 A1  Apr. 30, 2015

(30) Foreign Application Priority Data
May 31, 2012 (FR) .................................. 12 55047

(51) Int. Cl.
*B60T 13/56* (2006.01)
*B60T 13/577* (2006.01)

(52) U.S. Cl.
CPC ............ *B60T 13/56* (2013.01); *B60T 13/577* (2013.01)

(58) Field of Classification Search
CPC .............................. B60T 13/575; B60T 13/577
See application file for complete search history.

(56) References Cited

U.S. PATENT DOCUMENTS

| 4,469,009 A * | 9/1984 | Takayama | B60T 13/57 91/369.3 |
| 4,472,997 A * | 9/1984 | Ohmi | B60T 13/57 91/369.3 |
| 4,951,550 A * | 8/1990 | Ohki | B60T 13/57 403/155 |
| 4,953,446 A * | 9/1990 | Fecher | B60T 13/57 91/369.1 |
| 5,121,673 A * | 6/1992 | Araki | B60T 13/57 91/369.1 |
| 5,626,069 A * | 5/1997 | Uyama | B60T 13/57 91/369.3 |
| 8,505,435 B2 * | 8/2013 | Mallmann | B60T 13/57 91/369.3 |
| 2005/0039596 A1 * | 2/2005 | Krebs | B60T 13/569 91/376 R |

FOREIGN PATENT DOCUMENTS

| FR | 2 908 373 | 5/2008 |
| GB | 2 095 778 | 10/1982 |
| WO | 03/064231 | 8/2003 |

* cited by examiner

Primary Examiner — Thomas E Lazo
(74) Attorney, Agent, or Firm — Gerard Messina

(57) ABSTRACT

A vacuum brake booster includes a housing in which a piston is accommodated, the piston being supported by a cylindrical body sealingly passing through an opening in the bottom and having a key that engages with the return element of the cylindrical recess. A damping element separates the front of the key from the rear of the base supporting the piston and the bead of the membrane.

3 Claims, 2 Drawing Sheets

VACUUM BRAKE BOOSTER

FIELD OF THE INVENTION

The present invention concerns a vacuum brake booster comprising a housing formed by a back accommodating a piston and completed by a cover that delimits two chambers in which a vacuum is initially established, and wherein the chamber is connected to the atmosphere by a valve assembly to create, upon command, a pressure differential applied to the piston pushing the master cylinder by an intermediary piston, wherein the piston has a membrane pressed against its rear face, whose external periphery is secured at the crimp at the back and the cover and the internal periphery around the (XX) axis of the vacuum brake booster is secured to the base of a cylindrical body housing the valve assembly controlling the pneumatic operation of the vacuum brake booster, wherein the cylindrical body crosses the opening equipped with a bottom seal in a leakproof manner, wherein the cylindrical body bears an inverted U-shaped key that is slid into two grooves in the cylindrical body and engages with the return element of the cylindrical recess ahead of the seal recess.

BACKGROUND INFORMATION

In general vacuum brake boosters exist of the type discussed in document FR 2,908,373. Those brake boosters have a key or locking element serving as a rear stop for the mobile assembly leading the piston into equilibrium position whenever the brake booster is at rest. But when the brake booster is actuated, the key remains free inside its recess and can then begin to vibrate, generating noise.

SUMMARY OF THE INVENTION

An object of the present invention is the resolution of the noise problem associated with the brake booster key regardless of the position of the key between the exterior element and the body bearing the valve assembly to avoid vibrations.

To that end, the object of the invention is a brake booster of the type described above, characterized by a damping element between the front of the key and the rear of the base plate supporting the piston and the membrane bead.

The brake booster key according to the invention is held in a slightly preloaded position at all times, which avoids key noise during braking but also whenever the key makes contact with the stop.

The brake booster according to the invention has a simple structure with respect to both its realization and its assembly.

According to another advantageous characteristic, the key is an inverted U-shaped part having two arms engaged in the lateral grooves of the body.

According to another advantageous characteristic, the damping element is a part made of rubber, flexible plastic, or a foam.

The present invention will be described in greater detail by an embodiment of a vacuum brake booster, shown in the attached drawings.

DETAILED DESCRIPTION

Figure 1:
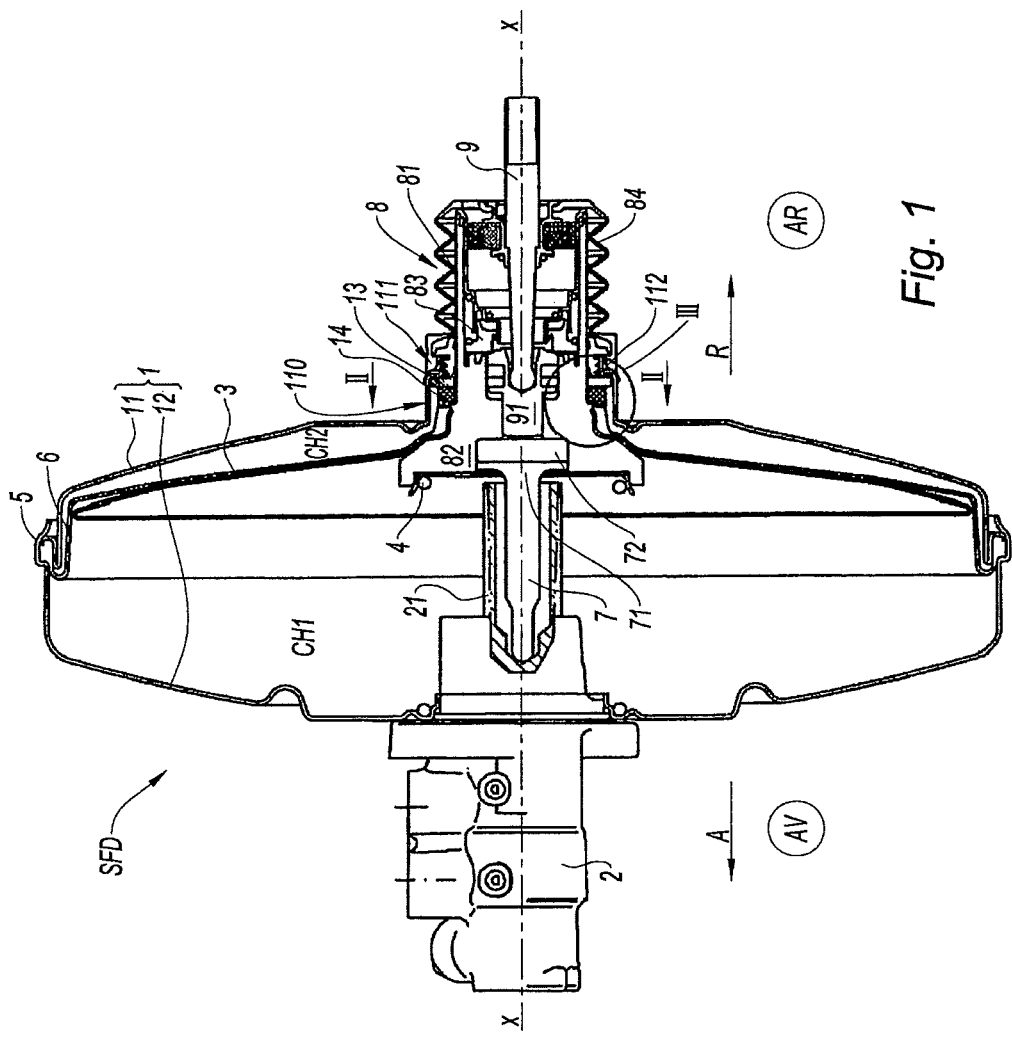
FIG. 1 is an axial section of a vacuum brake booster.

According to FIG. 1, a vacuum brake booster (SFD) is composed of vacuum housing 1 formed of back 11 connected to cover 12, with the interposition of rigid piston 3 connected to peripheral crimping region 5 of back 11 and cover 12 by membrane 6 so as to delimit, on either side of piston 3, a chamber CH1, CH2 initially under vacuum; one (CH2) of the chambers being brought to atmospheric pressure at the moment of braking in order to create the force acting on push rod 7 actuating master cylinder 2, such as a tandem master cylinder. Pneumatic control of the brake booster is provided by valve assembly 8, not shown in detail, actuated by control rod 9, which is itself connected by a linkage to the brake pedal, which is not shown.

Master cylinder 2 is secured to brake booster SFD and the assembly, thus assembled, is secured to the partition separating the engine compartment at the front (AV) and the vehicle passenger compartment at the rear (AR), depending on the orientation of the vehicle.

Valve assembly 8 is housed in cylindrical body 81 bearing piston 3 by its enlarged base 82 and housing head 71 of thrust rod 7 with interposition of reaction disk 72. Piston 3 pushes rod 7 while being supported by reaction disk 72 from front 82 of cylindrical body 81.

The advance of piston 3 is controlled by venting chamber CH2 with valves 83, not shown, of valve assembly 8; the force thus exerted on primary piston 21 of master cylinder 2 is the product of the surface area of piston 3 and the pressure differential between chambers CH1, CH2.

Actuation of vacuum brake booster SFD is triggered by the movement of control rod 9, pushed by the brake pedal, not shown, and opening valves 83 to the atmosphere. During this normal operation of vacuum brake booster SFD, reaction disk 72 is pushed only by piston 3. The return movement (arrow R) is accomplished by spring 4, which is merely indicated.

During normal actuation, intermediary piston 91 connected to control rod 9, does not push reaction disk 72. It is only in cases of the failure of brake booster SFD that rod 9 pushes piston 7 directly through intermediary piston 91 and reaction disk 72.

The mobile assembly consisting of piston 3 and body 81, 82 is freely mounted in translation in opening 111 of cylindrically shaped back 11 with return 112 constituting stop surface 112a and recess 112b for seal 113. Seal 113 is pressed against the exterior cylindrical surface of cylindrical body 81. The portion of body 81 projecting from opening 111 is covered by bellows 84.

Mobile assembly 3, 81, 82 is limited in its reverse movement (arrow R) by inverted U-shaped key 13 whose arms 131 are slid into two lateral grooves 85 of body 81 or its enlarged base 82 to engage with the peripheral surface of stop 112a.

The contour of key 13 is inscribed in the interior contour of sleeve 110 of back 11 terminated by return 112 and surrounding the front portion of cylindrical body 81.

On the forward side, key 13 is in contact with damping element 14 made of a supple material, such as rubber, a plastic material, or a plastic foam, which prevents key 13 from making noise whenever it is no longer engaged with surface 112a while piston 3 pushes rod 7 (arrow A).

Figure 2:
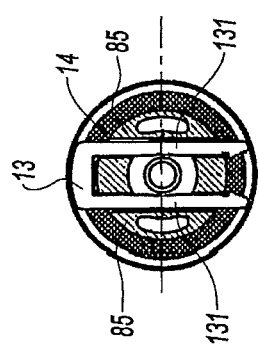
FIG. 2 is a cross-section along plane II-II of the brake booster of FIG. 1.
Figure 3:
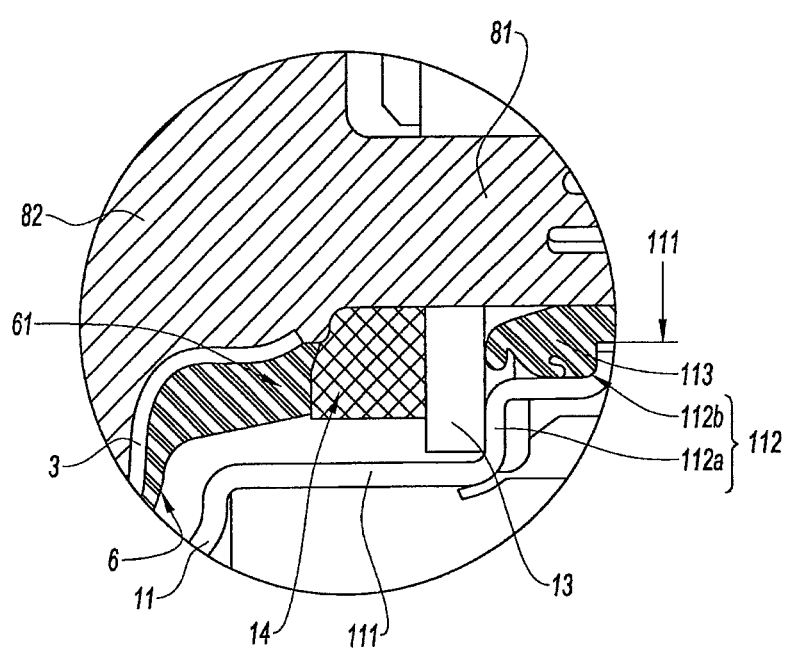
FIG. 3 is an enlarged detail view of part III of FIG. 1.

Damping element 14, for example, annular in shape (FIG. 2), is on cylindrical body 81 in front of base 82 bearing the extremity of piston 3 and bead 61 of membrane 6 covering piston 3. Damping element 14 is installed before the installation of key 13 and is held in place by it.

Mobile assembly 3, 8 with key 13 is introduced into opening 111,112 of back 11 of the housing together with spring 4, then, after installation of cover 12, the peripheral edges are crimped, imprisoning the edge of membrane 6 borne by piston 3.

REFERENCE KEY

| | |
|---|---|
| SFD | vacuum brake booster |
| AV | front |
| AR | rear |
| A | arrow/braking |
| R | arrow/debraking |
| CH1, CH2 | chambers of the brake booster |
| 1 | housing |
| 11 | back |
| 110 | recess |
| 111 | opening |
| 112 | return |
| 112a | stop surface |
| 112b | seal recess |
| 113 | seal |
| 12 | cover |
| 13 | key |
| 131 | arms |
| 2 | master cylinder |
| 21 | primary piston |
| 3 | brake booster piston |
| 4 | piston 3 return spring |
| 5 | peripheral crimp |
| 6 | membrane |
| 7 | push rod |
| 71 | push rod head |
| 72 | reaction disk |
| 8 | valve assembly |
| 81 | cylindrical body |
| 82 | base |
| 83 | valves |
| 84 | lateral groove |
| 9 | control rod |
| 91 | intermediary piston |

The invention claimed is:

1. A vacuum brake booster, comprising:
   a housing formed by a back portion and a front cover, the housing configured to accommodate a piston that delimits two chambers of the housing in which a vacuum is initially established, wherein one of the two chamber is connected to the atmosphere by a valve assembly to create, upon command, a pressure difference applied to the piston pushing a master cylinder by an intermediary piston;
   a cylindrical body that houses a valve assembly controlling a pneumatic operation of the vacuum brake booster, the cylindrical body including:
      a base plate to which a membrane of the piston is secured; and
      two grooves configured to bear an inverted U-shaped key which, when in a rest position, engages with a stopping surface of a return element of the back portion; and
   a damping element placed between a surface of the key and a surface of the base plate of the cylindrical body.

2. The vacuum brake booster of claim 1, wherein the key is in the shape of an inverted U with two arms engaged in lateral grooves of the cylindrical body.

3. The vacuum brake booster of claim 1, wherein the damping element is made of rubber, flexible plastic, or foam.

* * * * *